Figure 1:
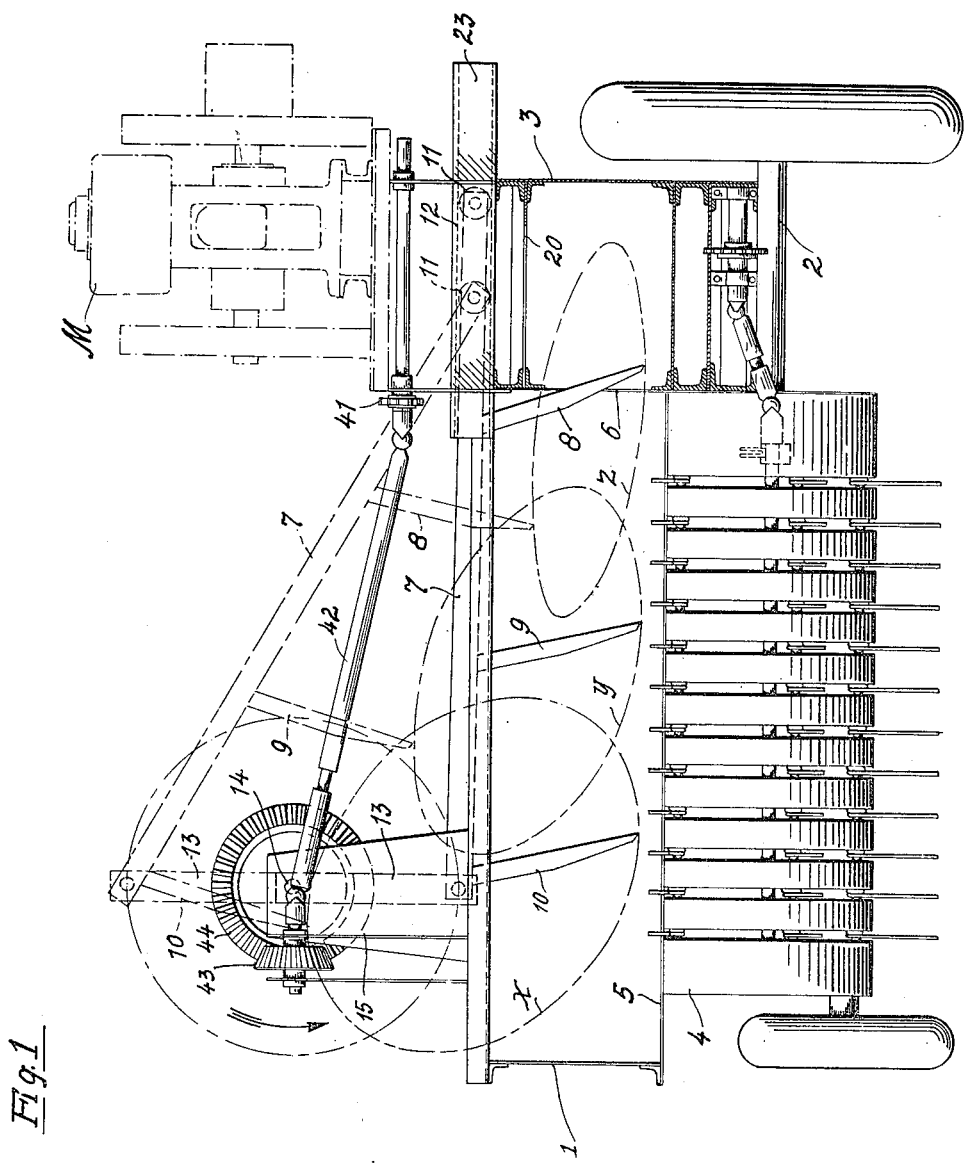

Aug. 28, 1956         W. LÖHNERT         2,760,625
                CROSS-CONVEYER OF A PICK-UP BALER
Filed April 1, 1952                      2 Sheets-Sheet 1

Inventor
W. Löhnert
By Glascock Downing & Seebold
Attys.

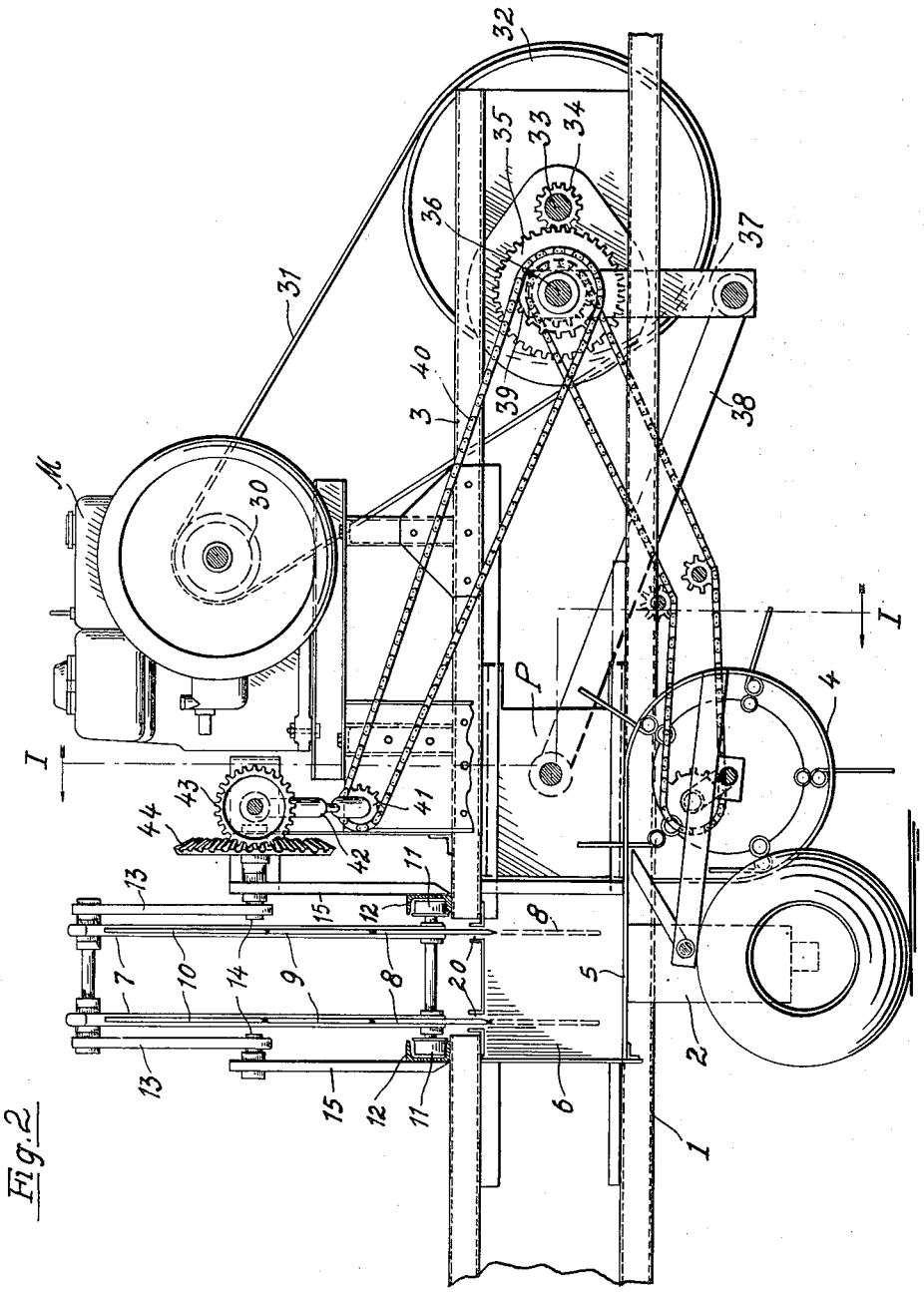

United States Patent Office 2,760,625
Patented Aug. 28, 1956

2,760,625

CROSS-CONVEYER OF A PICK-UP BALER

Walter Löhnert, Wolfenbuttel, Germany, assignor to Gebrüder Welger, Maschinenfabrik, Gebr. Welgerstrasse, Wolfenbuttel, Germany, a firm Application April 1, 1952, Serial No. 279,853

2 Claims. (Cl. 198—223)

The present invention relates to a cross-conveyer of a baler for hay, straw and the like, and is particularly directed to a cross-conveyer of a pick-up baler having a feed-opening in the vertical side of the baling chamber.

One object of the present invention is to provide a cross-conveyer of improved construction for a baler.

Another object of the invention is the provision of improved feeding means for feeding the material to be baled through a feed-opening in the vertical side of the baling chamber of a pick-up baler.

Heretofore the cross-conveyer for conveying the material accumulated by the pick-up unit on the accumulating table across that table as far as the feed-opening in the vertical side wall of the baling chamber, and the feeding means for feeding the material through said feed-opening into the baling chamber, were formed of separate units which had to be operated by separate actuating and controlling means, whereby the cost of production and operation was increased.

In order to overcome this drawback of known constructions the invention proposes to combine the aforesaid cross-conveying and feeding means to one single unit in such a way that both can be operated by the same actuating and controlling means, whereby the manufacture and operation of the baler is considerably cheapened.

Additional features and advantages of the invention will be understood from a consideration of the following detailed description taken in connection with the accompanying drawings, forming a part of this specification and in which there has been illustrated by way of example an embodiment of the invention. However, it is to be noted that this invention is not confined to any strict conformity with the showing of the drawings, but may be changed or modified, so long as such changes or modifications mark no material departure from the salient features of the invention as expressed in the appended claims.

In the drawings in which like parts are referred to by the same reference characters Fig. 1 is a front view, partly in section, of a pick-up baler, on line I—I of Fig. 2;

Fig. 2 is a side elevation of the pick-up baler of Fig. 1.

Referring now to the drawings in detail, the reference numeral 1 denotes the pick-up baler adapted for operation by a motor M or by the power take-off shaft of a tractor. The pick-up baler 1 consists in known manner of the running gear 2, the baling chamber 3 and plunger P longitudinally mounted on the running gear 2 in the driving direction thereof, the pick-up unit 4 of known construction positioned laterally of the aforesaid baler unit, the accumulating table 5 arranged in the plane of the baling chamber 3 provided in its vertical side wall with the feed opening 6, and of the cross-conveyer 7 arranged above the accumulating table 5 and provided with the connecting arms 8, 9, 10 adapted to convey the material accumulated by the pick-up unit 4 on the accumulating table 5 toward and through the aforesaid feed-opening 6 into the baling chamber 3 as soon as the plunger P, reciprocating in the baling chamber 3, is in its retracted position.

The cross-conveyer 7 consists of either one or a plurality of connecting rods 7, each of which is provided on its lower side with the conveying or feeding or packer arms or members 8, 9, 10. The ends of the connecting rods 7 positioned in the proximity of the feed-opening 6 of the baling chamber 3 are shiftably and pivotally supported by the guide rollers 11 and thereby enabled to move forward and backward between the guide bars 12 of U-shaped formation. The other ends of the connecting bars 7 are pivotally secured to the crank arms 13 of a crank shaft 14 rotatably supported in the uprights 15 mounted on the vehicle frame 2. The crank shaft 14 is driven by the motor M in the following manner: The pulley 30 of the motor M drives by means of the belt 31 the pulley 32 fastened on a shaft 33. The shaft 33 carries the gear wheel 34 which rotates the gear 35 mounted on the crank-shaft 36, which in its turn actuates via the crank-arm 37 and connecting rod 38 the plunger P reciprocating in the baling chamber 3. Fastened on the crank-shaft 36 is the sprocket-wheel 39 which by means of the chain 40 actuates the sprocket-wheel 41. The sprocket-wheel 41 drives by the intermediary of the Cardan shaft 42 the bevel wheel 43 meshing with the bevel wheel 44 mounted on the end of the crank-shaft 14 and thus actuates by means of the crank-arms 13 the connecting rods 7.

These actuating means are so devised and their operation with respect to each other is so timed that the plunger P moves into its retracted position whenever the connecting rod or rods 7 move in the direction toward the feed-opening 6 of the baling chamber 3 and vice versa.

The crank-shaft 14 is rotatably supported in the uprights 15 at such a height above the accumulating table 5 that during the conveying stroke of the connecting rods 7 the pointed ends of the packer members 8, 9, 10 of the connecting rods 7 penetrate from above into the material accumulated on the accumulating table 5 and feeding it to the feeding opening 6 of the baling chamber 3, while during the return stroke of the connecting rods 7 the packer members idly slip over the material, and move in the way indicated by the curves $x$, $y$, $z$ in Fig. 1.

The packer members 8 are arranged at the connecting rods 7 at such a distance from the feed-opening 6 of the baling chamber 3 that during the conveying stroke of the connecting rods the packer members 8 will pass through the feed-opening 6 into the baling chamber 3 and effectively act as feeding means. In this connection attention is called to the upper wall of the baling chamber 3 which is provided with the laterally open slots 20 through which the packer members 8 enter into and emerge from the baling chamber 3. Attention is further invited to the elongated portion 23 of the guide bars 12 (see Fig. 1) extending beyond the outer wall of the baling chamber 3. When the construction is devised like this the guide rollers 11 of the connecting rods 7 can be displaced in outward direction to such an extent that the packer members 8 can be pulled deeply into the baling chamber 3.

It will be seen that the cross-conveyer 7 and the feeding means 8 form an undivided unit, and that the operation of both is effected and controlled by a common crank shaft 14. The unit 7, 8 is of simple and stable construction and requires for its orderly operation but little attention, such as greasing etc.

Another advantage of the invention resides in the feature that the pointed packer members 8, 9, 10 can be relied upon to penetrate without fail into the material accumulated on the accumulating table underneath the packer members, even though the material to be baled may be of a type which offers considerable resistance to the penetration of the packer members, such as soft and entangled clover or hard and stubborn straw.

Still another advantage of the construction is due to the fact that during the conveying stroke the packer members of the connecting rods 7 compress the material accumulated on the accumulating table underneath them, so that the material is fed into the baling chamber already in precompressed condition. This is important in cases where the material to be baled is loose hay.

What I claim as new and desire to secure by Letters Patent of the United States is:

1. In a pick-up baler having a baling chamber including a vertical wall provided with a feed opening and an accumulating table extending generally horizontally outwardly from and normal to said wall adjoining the opening and along which crop material may be moved through the feed opening and into the baling chamber, the improvement residing in feed mechanism comprising conveying means arranged above the accumulating table and comprising a supporting frame, a crank shaft including a crank pin supported in said frame above one end of the accumulating table and guiding means positioned above the baling chamber and also including at least one connecting rod extending substantially the full length of the accumulating table provided with a plurality of feed elements suitably spaced apart and adapted to engage in the crop material on the accumulating table, the end of the conveying means which extends in a direction away from the baling chamber being coupled to said crank pin of said crank shaft, the end of the conveying means which is positioned near the baling chamber extending above and beyond the vertical wall in which the feed opening is arranged and guided in said guiding means, and one of the feed elements being fastened to the conveying means at a distance from the end of the latter near the baling chamber so as to be moved during the conveying stroke and return stroke from a position outside the baling chamber away from the feed opening into a position within the baling chamber and vice versa.

2. A pick-up baler as specified in claim 1 in which the guiding means for the end of the conveying means positioned near the baling chamber extend beyond the wall of the baling chamber which is positioned opposite the wall in which the feed opening is arranged, and that during the conveying stroke the aforesaid end of the conveying means moves beyond that wall, and that a feed element nearest to the aforesaid end of the conveying means is rigidly fastened to the conveying means and moved during the conveying stroke and return stroke with said conveying means from a position outside the baling chamber and away from the feed opening to a position within the baling chamber and back again through slots which are provided in the covering wall of the baling chamber and which are open at their forward end, whereby said feed element is moving upward and downward in vertical direction with said conveying means.

References Cited in the file of this patent

UNITED STATES PATENTS

| | | |
|---|---|---|
| 485,045 | Kruse et al. | Oct. 25, 1892 |
| 845,625 | Field | Feb. 26, 1907 |
| 1,043,598 | James | Nov. 5, 1912 |
| 1,857,373 | Goggins | May 10, 1932 |
| 2,409,478 | Dickow | Oct. 15, 1946 |
| 2,450,082 | Crumb et al. | Sept. 28, 1948 |
| 2,572,180 | Morrison | Oct. 23, 1951 |
| 2,647,355 | Luke | Aug. 4, 1953 |

FOREIGN PATENTS

| | | |
|---|---|---|
| 227,413 | Germany | Oct. 22, 1910 |
| 22,890 | Denmark | Feb. 22, 1918 |
| 153,133 | Australia | Sept. 8, 1953 |